United States Patent [19]

Iizuka et al.

[11] Patent Number: 4,586,960

[45] Date of Patent: May 6, 1986

[54] CEMENT ADMIXTURE

[75] Inventors: Masanori Iizuka; Hideki Tanaka, both of Wakayama, Japan

[73] Assignee: Kao Corporation, Tokyo, Japan

[21] Appl. No.: 624,634

[22] Filed: Jun. 26, 1984

[30] Foreign Application Priority Data

Jul. 8, 1983 [JP] Japan ................... 58-124339

[51] Int. Cl.$^4$ .............................................. C04B 24/04
[52] U.S. Cl. ....................... 106/90; 106/314; 524/4; 524/5; 524/6
[58] Field of Search ............... 106/90, 314; 524/4-6

[56] References Cited

U.S. PATENT DOCUMENTS

| | | | |
|---|---|---|---|
| 4,042,407 | 8/1977 | Natsuume | 106/90 |
| 4,125,410 | 11/1978 | Natsuume | 106/90 |
| 4,325,736 | 4/1982 | Okada et al. | 106/90 |

*Primary Examiner*—William R. Dixon, Jr.
*Assistant Examiner*—Karl Group
*Attorney, Agent, or Firm*—Flynn, Thiel, Boutell & Tanis

[57] ABSTRACT

This invention provides a cement admixture comprising a copolymer of an olefin having 2 to 8 carbon atoms with an ethylenically unsaturated dicarboxylic acid anhydride and a cement admixture comprising the copolymer and a water-reducing agent.

The cement admixture of this invention can prevent the lowering of the fluidity, or slump loss of a hydraulic cement mix such as concrete, mortar, or paste with the lapse of time and provide improved applicability and workability.

23 Claims, No Drawings

CEMENT ADMIXTURE

BACKGROUND OF THE INVENTION

This invention relates to an admixture for cements or cement mixes, and more particularly to a cement admixture which can prevent the lowering with time of the fluidity of concrete, mortar, or paste which is a hydraulic cement mix and improve its applicability and workability.

Conventionally, a cement mix prepared by mixing cement with water and, if necessary, sand, gravel, and admixtures loses its fluidity gradually after mixing, and its applicability and workability are lowered with the passing of time because the physical and chemical coagulation proceeds with the passing of time. Therefore, a cement mix has a drawback that its serviceable life (pot life) is limited. In most cases, cement mixes are transported to a concreting site by an agitator truck (a ready-mix concrete mixer truck) after they have been mixed in advance and the time necessary for transportion varies largely depending on the transportation distance and the extent of traffic jams. Therefore, it is extremely difficult to achieve constant applicability at the concreting site because the fluidity of the concrete varies with each agitator truck.

Further, there are many problems in pumping a cement mix in that when the pumping is discontinued for the sake of a lunch break or a change in the work procedures and the pumping is restarted, the fluidity of the concrete mix in the pipe is lowered and the pumping pressure rises suddenly upon restarting the pumping or blockage occurs.

Further, in performing centrifugal compaction of concrete or mortar, concrete is placed in a centrifugal molding form after mixing and the centrifugal compaction is performed usually after several molding forms have been filled. In these cases, if a long time is required to fill the forms, the concrete loses its fluidity and becomes difficult to compact centrifugally.

Therefore, several processes have been proposed for preventing the fluidity loss of a cement mix.

For example, a process was proposed in which a retarder such as a hydroxycarboxylic acid was added for the purpose of preventing chemical coagulation. According to this process, it is difficult to prevent physical coagulation, though the hydration reaction of cement can be retarded, so that the slump loss can not be sufficiently prevented. Further, it has a drawback that the early strength of concrete or mortar is lowered.

Another process was proposed in Japanese Patent Laid-Open No. 139929/1979 in which the slump loss could be prevented by adding a granular concrete fluidizer such as β-NSF to concrete or the like and gradually dissolving the fluidizer. According to this process, it is possible to prevent the slump loss to some extent, but it has a drawback that the strength and durability are lowered because the granular fluidizer remains locally in the hardened concrete.

According to still another process disclosed in Japanese Patent Publication No. 15856/1976 the fluidity of concrete can be maintained for a long time by adding a fluidizer such as β-NSF in divided portions or continuously to concrete or the like. Although this process is effective as a process for preventing the slump loss, the addition of the fluidizer in this manner is laborious, and it is impossible to prevent the slump loss of a concrete which is in a state in which the divided addition of a fluidizer is difficult, such as the one contained in piping for pumping, or the one contained in a centrifugal compaction form.

Thus, each of these conventional processes for preventing the fluidity loss of a cement mix has several problems so that they can not be thought to be satisfactory.

SUMMARY OF THE INVENTION

This invention has been performed with a view to ameliorating the drawbacks of the above-described conventional processes, and is based on the finding that by adding an anhydrous copolymer of an olefin having 2 to 8 carbon atoms with an ethylenically unsaturated dicarboxylic acid anhydride to a cement mix, the fluidity of the cement mix can be retained for a long time and the fluidity can be maintained constant, which leads to a markedly improved applicability and workability of the cement. Namely, this invention provides a cement admixture based on an anhydrous copolymer of an olefin having 2 to 8 carbon atoms with an ethylenically unsaturated dicarboxylic acid anhydride, and relates to a cement admixture which is extremely effective in preventing the fluidity loss, i.e., slump loss, of a cement mix.

DETAILED DESCRIPTION OF THE PREFERRED EMBODIMENT

The mechanism by which the slump loss can be prevented in this invention is described as follows.

The cement particles in a cement mix prepared by mixing cement with water and, if necessary, sand, gravel, and an admixture gradually lose their fluidity after mixing because the chemical coagulation by a hydration reaction and the physical coagulation by an attractive force among the particles proceed slowly. Therefore, slump loss occurs in a cement mix such as concrete or mortar. If a cement dispersant is added at this point, a repulsive force is exerted among the cement particles, the fluidity is improved, and the slump loss can be prevented temporarily.

Nevertheless, the hydration reaction proceeds further, and a gel of ettringite (commonly called cement bacillus or calcium sulfoaluminate) is formed continuously. Therefore, the fluidity of the system continues to lower and, at the same time, the coagulation of the cement particles proceeds in such a way that the cement dispersant is adsorbed or occluded in freshly deposited minerals such as ettringite which is freshly formed in the solution or on the cement particles, and the concentration of the cement dispersant in the solution is lowered. In this case, the slump loss can be prevented if the cement dispersant can be continuously supplied by some means or other.

The inventors of this invention have paid attention to a water-soluble salt of a copolymer of an olefin having 2 to 8 carbon atoms with an ethylenically unsaturated dicarboxylic acid anhydride which is already known as a cement dispersant. As a result of an extensive study to search for a process for continuously supplying this cement dispersant to a cement mix, the inventors of this invention have developed the cement admixture of this invention. Namely, the ahydrous copolymer of an olefin having 2 to 8 carbon atoms with an ethylenically unsaturated dicarboxylic acid anhydride is insoluble in water, so that it does not dissolve at once and shows no dispersibility in cement when it is added to a cement mix.

However, as the hydration reaction of the cement proceeds, metal ions such as Ca, Na, or Mg are dissolved out and render the cement mix strongly alkaline (pH 12 to 14). Thus, the above-mentioned copolymer is gradually hydrolyzed with the alkali in the cement mix, as shown by the following formula, whereby the copolymer becomes water-soluble and exhibits dispersibility in cement slowly, so that the fluidity of the cement mix can be maintained for a long time to prevent the slump loss.

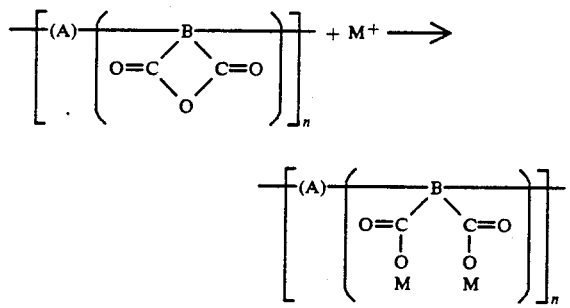

wherein M is an alkali metal, or an alkaline earth metal, and A is an olefin having 2 to 8 carbon atoms.

In this invention, the most important factor for preventing the slump loss of a cement mix is a balance between the rate of slump loss due to the chemical and physical coagulation of cement particles and the hydrolysis rate of the copolymer. Namely, the slump loss occurs when the hydrolysis rate of the copolymer is low as compared with the coagulation rate of the cement particles, and the slump of the cement mix is increased when the hydrolysis rate is excessively high.

In this invention, a cement admixture which can maintain the fluidity of a cement mix constant for a long time and prevent the slump loss is developed by controlling the number of olefin carbon atoms, particle diameter and molecular weight of the copolymer of an olefin having 2 to 8 carbon atoms with an ethylenically unsaturated dicarboxylic acid anhydride. Namely, when the number of the olefin carbon atoms is increased, the hydrolysis rate is lowered, and in case of an olefin having 9 carbon atoms or higher, the hydrolysis occurs in the cement mix to an extremely low or even does not occur and, therefore, such copolymers are not suitable as the copolymers of this invention.

The molecular weight of the copolymer of this invention falls within the range of 500 to 20,000. The particle diameter of the copolymer is within the range of 0.1 to 1,000 μm. When it is below 0.1 μm, the hydrolysis rate is excessively high, while when it is above 1,000 μm, the hydrolysis rate is low and the copolymer locally remains in the cement mix unfavorably. Examples of the olefin having 2 to 8 carbon atoms in the copolymer with an ethylenically unsaturated dicarboxylic acid anhydride include ethylene, propylene, n-butene, isobutylene (including return B.B.), n-pentene, cyclopentene, 2-methyl-1-butene, n-hexene, cyclohexene, 2-methyl-1-pentene, 3-methyl-1-pentene, 4-methyl-1-pentene, 2-ethyl-1-butene, diisobutylene, and mixtures thereof, among which isobutylene is particularly desirable. Examples of the ethylenically unsaturated dicarboxylic acid anhydride include maleic anhydride, itaconic anhydride, and citraconic anhydride, among which maleic anhydride is particularly desirable. The molar copolymerization ratio is suitable within the range of 4/6 to 6/4. The inventors of this invention have found that it is possible to improve further the applicability, workability and the like of a cement mix by adding a water-reducing agent together with the above copolymer to a cement mix.

Examples of the water-reducing agents to be used in this invention include naphthalenesulfonic acid/formaldehyde polycondensate type water-reducing agents such as β-naphthalenesulfonic acid/formaldehyde polycondensate and its salt; sulfonated melamine resin type water-reducing agents such as water-soluble salts of sulfonated melamine resin; lignosulfonic acid type water-reducing agents such as lignosulfonic acid or its salt; or water-soluble salts of copolymers of an olefin having 2 to 8 carbon atoms with an ethylenically unsaturated dicarboxylic acid. The ratio of the above copolymer to the water-reducing agent is preferably 1:99 to 99:1 (ratio by weight).

The cement admixture of this invention may be added to a cement mix in any form including suspension, powder, and granules. With respect to the timing of its addition, dry blending with cement, dissolution in kneading water, and addition to a cement mix already kneaded are all possible. Further, when a water-reducing agent is used, it may be possible to premix a water-reducing agent such as β-naphthalene-sulfonic acid/formaldehyde polycondensate or its salt, or a water-soluble salt of a sulfonated melamine resin with the copolymer of an olefin having 2 to 8 carbon atoms with an ethylenically unsaturated dicarboxylic acid anhydride, and further it is also possible to add one of them after the other has been added to cement or after the other is added to cement and kneaded.

Further, it is also possible to use other cement additives such as air-entraining agents, fluidizers, waterproofing agents, expansion agents, glass fiber, steel fiber, fly ash, or blast-furnace slag.

Concrete to which the cement admixture of the invention has been added can be hardened by any method which is used in hardening ordinary concrete, and can also be hardened by methods such as steam curing or autoclave curing.

With respect to the effect obtained when the cement admixture of this invention is used, it is the most peculiar point that the fluidity of concrete is maintained constant, and it is disclosed for the first time by this invention that the fluidity can be maintained constant merely by adding the admixture of this invention to concrete. It becomes possible to impart such a characteristic property to concrete only when the above-mentioned copolymer of an olefin having 2 to 8 carbon atoms with an ethylenically unsaturated dicarboxylic acid anhydride is used.

The amount of the cement admixture of this invention depends on the duration of the fluidity of a cement mix, and is usually 0.03 to 2% (as solids), based on the cement weight.

Because it becomes possible according to this invention to maintain the fluidity of concrete constant, the cement admixture of this invention can be practically used in a variety of applications. For example, it is used as an aid for pumping concrete. Recently, a cement mix is transported to a concreting site by pumping in many cases. As mentioned earlier, when the pumping is discontinued for the sake of a lunch break, a change in the work procedures, a machine accident, or the like, a prolonged time of discontinuation causes lowering of the fluidity of the concrete in the piping, thus giving rise to a problem of a sudden rise in the pumping pressure upon restarting the pumping and a problem of blockage.

However, when the cement admixture of this invention is added, the fluidity of concrete can be maintained constant, and the fluidity loss can be prevented. Thus it becomes possible to prevent the rise in the pumping pressure when the pumping is discontinued and then restarted, and it becomes possible to heighten the efficiency of the pumping work markedly.

Further, the cement admixture of this invention can be used as an aid for centrifugal compaction. The centrifugal compaction molding process is one for molding a cement-containing material such as mortar, concrete, or an asbestos/cement mixture to obtain secondary products by utilizing the centrifugal force caused by rotation. When the centrifugal compaction molding is performed by using the cement admixture of this invention, the fluidity of concrete before molding can be maintained for a long time, so that the finishing of the products becomes easy, and the prevention of lime wash formation and clarification of waste water are effectively performed.

In a still another example, the cement admixture of this invention is also effective in maintaining the fluidity of a grafting aid for cement milk or mortar, a cement mix placed through a tremie pipe, underwater concrete, concrete for continuous underground walls, or the like, and to prevent the materials from being separated from each other.

This invention will be described in further detail with reference to examples.

EXAMPLE 1

The effects of anhydrous products (molar copolymerization ratio of 1/1) of various samples different in the number of olefin carbon atoms and molecular weight on preventing the lowering of the fluidity of concrete were investigated by using maleic anhydride as the ethylenically unsaturated dicarboxylic acid anhydride.

The measurement of the effect of preventing the fluidity lowering was carried out by using the concrete of the following materials and formulation and according to the Method of Test for Slump of Concrete as specified in JIS A1101.

Materials used:
cement (c): ordinary portland cement (specific gravity of 3.17)
fine aggregate (s): from Kinokawa (specific gravity of 2.57)
coarse aggregate (g): from Hidaka-gawa (specific gravity of 2.59)
Formulation: water (W) total aggregate (A): fine aggregate + course aggregate

TABLE 1

| W/C | S/A | C | W | S | G |
|---|---|---|---|---|---|
| 53 | 48 | 320 | 170 | 850 | 926 |

The amount of the prepared sample added was 0.1% by weight based on the cement weight.

A given sample was added to a concrete prepared according to the formulation shown in Table 1 (50 l of concrete was prepared by mixing the materials for 2 minutes by using a 100-l tilting mixer). The concrete was continuously agitated at a constant speed of 4 rpm and measured for slump at given times. Table 2 shows the results.

TABLE 2

| | | Sample | | Variation of slump with time | | | |
|---|---|---|---|---|---|---|---|
| Experiment No. | | Olefin | Viscosity-average molecular weight | Just after mixing | After 30 min | After 60 min | After 90 min |
| Copolymers of this invention | 1 | ethylene | 200 | 15.9 | 14.2 | 12.0 | 10.5 |
| | 2 | | 3,000 | 15.0 | 17.0 | 16.5 | 16.0 |
| | 3 | | 30,000 | 15.5 | 13.1 | 11.2 | 10.0 |
| | 4 | isobutylene | 200 | 14.9 | 13.5 | 13.0 | 12.5 |
| | 5 | | 10,000 | 15.6 | 16.5 | 17.2 | 16.0 |
| | 6 | | 30,000 | 15.8 | 14.5 | 13.8 | 12.0 |
| | 7 | 1-hexene | 200 | 14.5 | 12.5 | 11.9 | 10.0 |
| | 8 | | 10,000 | 16.0 | 15.0 | 16.2 | 16.0 |
| | 9 | | 30,000 | 15.8 | 12.0 | 10.5 | 8.9 |
| | 10 | diisobutylene | 200 | 14.3 | 9.0 | 6.3 | 3.0 |
| | 11 | | 6,000 | 15.2 | 14.0 | 14.0 | 15.0 |
| | 12 | | 30,000 | 15.5 | 11.0 | 10.0 | 8.6 |
| Comparative copolymer | 13 | 1-decene | 200 | 14.3 | 9.0 | 6.3 | 3.0 |
| | 14 | | 6,000 | 15.6 | 11.0 | 7.5 | 4.5 |
| | 15 | | 30,000 | 15.0 | 10.5 | 7.0 | 4.0 |

The experimental results in Table 2 show that the slump of concrete could be maintained nearly constant for 90 minutes in Experiment Nos. 2, 5, 8, and 11, and that although the effect could be obtained also in cases of a smaller molecular weight, i.e., Nos. 1, 4, 7, and 10 and in cases of a larger molecular weight, i.e., Nos. 3, 6, 9, and 12, the effect was the largest in the above-mentioned cases, i.e., Nos. 2, 5, 8, and 11.

On the other hand, the slump of concrete was lowered with the lapse of time and no effect of slump loss prevention could be obtained in Experiment Nos. 13, 14, and 15 as comparatives.

EXAMPLE 2

Investigation was made about the effects of a mixture of a copolymer of an olefin having 2 to 8 carbon atoms with an ethylenically unsaturated dicarboxylic acid anhydride and a β-naphthalenesulfonic acid/formaldehyde polycondensate, a water-soluble salt of a sulfonated melamine resin, a lignosulfonic acid, or a water-soluble salt of a copolymer of an olefin having 2 to 8 carbon atoms with an ethylenically unsaturated dicarboxylic acid anhydride on preventing the fluidity lowering of concrete. Table 3 shows the results.

EXPERIMENTAL METHOD

The variation of the slump of concrete with time was measured by the same method as in Example 1.

The cement admixtures used were as follows:
(a) β-naphthalenesulfonic acid/formaldehyde polycondensate
(b) water-soluble salt of sulfonated melamine resin
(c) lignosulfonic acid
(d) water-soluble salt of pentene/maleic anhydride copolymer
(e) mixture of 50 parts by weight of β-naphthalenesulfonic acid/formaldehyde polycondensate and 50 parts by weight of isobutylene/maleic anhydride (anhydrous) copolymer
(f) mixture of 50 parts by weight of a water-soluble salt of sulfonated melamine resin and 50 parts by weight of isobutylene/maleic anhydride (anhydrous) copolymer
(g) mixture of 50 parts by weight of lignosulfonic acid and 50 parts by weight of an isobutylene/maleic anhydride (anhydrous) copolymer, and
(h) mixture of 50 parts by weight of a water-soluble salt of pentene/maleic anhydride copolymer and 50 parts by weight of isobutylene/maleic anhydride (anhydrous) copolymer.

TABLE 3

| Experiment No. | Admixture samples | Slump of concrete (cm) | | | |
|---|---|---|---|---|---|
| | | Just after mixing | After 30 min | After 60 min | After 90 min |
| Comparative admixture | 16 | a | 21.3 | 18.0 | 14.7 | 11.0 |
| | 17 | b | 21.1 | 17.9 | 14.0 | 10.8 |
| | 18 | c | 21.8 | 18.5 | 15.1 | 11.5 |
| | 19 | d | 21.0 | 18.1 | 14.9 | 11.1 |
| Admixture of this invention | 20 | e | 21.7 | 21.9 | 21.5 | 21.2 |
| | 21 | f | 21.4 | 21.0 | 20.7 | 20.5 |
| | 22 | g | 21.9 | 21.7 | 21.2 | 20.8 |
| | 23 | h | 21.2 | 21.5 | 21.1 | 20.6 |

The experimental results in Table 3 show that the slump of concrete could be maintained nearly constant for 90 minutes in Experiment Nos. 20 to 23 wherein the admixtures of this invention were used. On the other hand, the slump of concrete was lowered with the lapse of time, and no effect of preventing slump loss could be obtained in Experiment Nos. 16 to 19 as comparatives.

What is claimed is:

1. A composition consisting essentially of hydraulic cement mixed with 0.03 to 2% by weight of said cement of particles of a water-insoluble copolymer obtained by copolymerizing a first, ethylenically unsaturated, dicarboxylic acid anhydride monomer, with a second monomer selected from the group consisting of ethylene, propylene, n-butene, isobutylene, n-pentene, cyclopentene and 2-methyl-1-butene, said water-insoluble copolymer having a particle size in the range of from 0.1 to 1000 micrometers, said water-insoluble copolymer having a molecular weight in the range of from 500 to 20000, and an aggregate.

2. A composition as claimed in claim 1, in which the molar ratio of said first monomer to said second monomer is from 4/6 to 6/4.

3. A composition as claimed in claim 2, in which said copolymer consists of a copolymer of maleic anhydride and isobutylene.

4. A composition as claimed in claim 1 in which said water-insoluble copolymer has recurring units of the formula

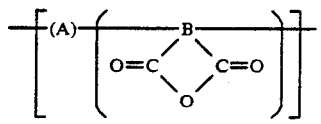

wherein A is a unit of said second monomer and B is a unit of said first monomer.

5. A composition as claimed in claim 1, in which said first monomer is selected from the group consisting of maleic anhydride, itaconic anhydride and citraconic anhydride.

6. A composition consisting essentially of hydraulic cement mixed with (a) 0.03 to 2% by weight of said cement of particles of a water-insoluble copolymer obtained by copolymerizing a first, ethylenically unsaturated, dicarboxylic acid anhydride monomer, with a second monomer selected from the group consisting of ethylene, propylene, n-butene, isobutylene, n-pentene, cyclopentene and 2-methyl-1-butene, said water-insoluble copolymer having a particle size in the range of from 0.1 to 1000 micrometers, said water-insoluble copolymer having a molecular weight in the range of 500 to 20000, (b) a water-reducing agent for hydraulic cement compositions and (c) an aggregate.

7. A composition as claimed in claim 6, in which the molar ratio of said first monomer to said second monomer is from 4/6 to 6/4.

8. A composition as claimed in claim 7, in which said copolymer consists of a copolymer of maleic anhydride and isobutylene.

9. A composition as defined in claim 6, wherein said water-reducing agent comprises at least one member selected from the group consisting of a naphthalenesulfonic acid/formaldehyde polycondensate water-reducing agent, a sulfonated melamine resin water-reducing agent, and a lignosulfonic acid water-reducing agent.

10. A cement admixture as defined in claim 6, wherein the water-reducing agent is a water-soluble salt of a copolymer of an olefin having 2 to 8 carbon atoms with an ethylenically unsaturated dicarboxylic acid.

11. A cement admixture as defined in claim 6, wherein the weight ratio of the copolymer to the water-reducing agent 12. A composition as claimed in claim 6, in which said water-insoluble copolymer has recurring units of the formula

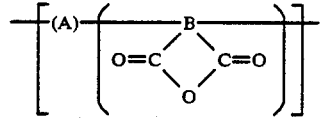

wherein A is a unit of said second monomer and B is a unit of said first monomer.

13. A composition as claimed in claim 6, in which said first monomer is selected from the group consisting of maleic anhydride, itaconic anhydride and citraconic anhydride.

14. A process for preparing a hydraulic cement composition having improved workability and stable fluidity, which comprises:

mixing with hydraulic cement, 0.03 to 2% by weight of said cement of particles of a water-insoluble copolymer obtained by copolymerizing a first, ethylenically unsaturated, dicarboxylic acid anhydride monomer, with a second monomer selected from the group consisting of ethylene, propylene, n-butene, isobutylene, n-pentene, cyclopentene and 2-methyl-1-butene, said water-insoluble copolymer having a particle size in the range of from 0.1 to 1000 micrometers, said water-insoluble copolymer having a molecular weight in the range of 500 to 20000.

15. A process as claimed in claim 14, in which the molar ratio of said first monomer to said second monomer is from 4/6 to 6/4.

16. A process as claimed in claim 15, in which said copolymer consists of a copolymer of maleic anhydride and isobutylene.

17. A process as claimed in claim 14, in which said water-insoluble copolymer has recurring units of the formula

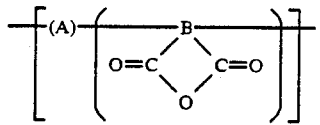

wherein A is a unit of said second monomer and B is a unit of said first monomer.

18. A process as claimed in claim 14, in which said first monomer is selected from the group consisting of maleic anhydride, itaconic anhydride and citraconic anhydride.

19. A process for preparing a hydraulic cement composition that requires a reduced amount of water and has improved workability and stable fluidity, which comprises:

mixing with hydraulic cement, (a) 0.03 to 2% by weight of said cement of particles of a water-insoluble copolymer obtained by copolymerizing a first, ethylenically unsaturated, dicarboxylic acid anhydride monomer, with a second monomer selected from the group consisting of ethylene, propylene, n-butene, isobutylene, n-pentene, cyclopentene and 2-methyl-1-butene, said water-insoluble copolymer having a particle size in the range of from 0.1 to 1000 micrometers, said water-insoluble copolymer having a molecular weight in the range of 500 to 20000, and (b) a water-reducing agent for hydraulic cement composition.

20. A composition as claimed in claim 19, in which the molar ratio of said first monomer to said second monomer is from 4/6 to 6/4.

21. A composition as claimed in claim 20, in which said copolymer consists of a copolymer of maleic anhydride and isobutylene.

22. A composition as claimed in claim 19, in which said water-insoluble copolymer has recurring units of the formula

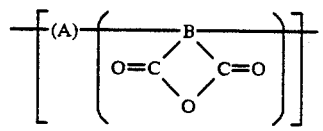

wherein A is a unit of said second monomer and B is a unit of said first monomer.

23. A composition as claimed in claim 19, in which said first monomer is selected from the group consisting of maleic anhydride, itaconic anhydride and citraconic anhydride.

* * * * *

UNITED STATES PATENT AND TRADEMARK OFFICE
CERTIFICATE OF CORRECTION

PATENT NO. : 4 586 960
DATED : May 6, 1986
INVENTOR(S) : Masanori Iizuka

It is certified that error appears in the above-identified patent and that said Letters Patent is hereby corrected as shown below:

Column 8, line 51; after "agent" insert ---falls within the range of 1:99 to 99:1.---.

Signed and Sealed this

Twenty-first Day of October, 1986

[SEAL]

*Attest:*

DONALD J. QUIGG

*Attesting Officer*      *Commissioner of Patents and Trademarks*